United States Patent
Kiefl et al.

(10) Patent No.: US 11,937,622 B2
(45) Date of Patent: Mar. 26, 2024

(54) OBTAINING A VOLATILE FRACTION FROM JUICES OR ALCOHOLIC BEVERAGES

(71) Applicant: SYMRISE AG, Holzminden (DE)

(72) Inventors: Johannes Kiefl, Holzminden (DE); Dominik Winkler, Höxter (DE); Stefan Brennecke, Halle (DE); Jens Michael Hilmer, Holzminden (DE); Alexander Kindel, Höxter (DE)

(73) Assignee: SYMRISE AG, Holzminden (DE)

( * ) Notice: Subject to any disclaimer, the term of this patent is extended or adjusted under 35 U.S.C. 154(b) by 347 days.

(21) Appl. No.: 17/268,714

(22) PCT Filed: Aug. 17, 2018

(86) PCT No.: PCT/EP2018/072292
§ 371 (c)(1),
(2) Date: Feb. 16, 2021

(87) PCT Pub. No.: WO2020/035147
PCT Pub. Date: Feb. 20, 2020

(65) Prior Publication Data
US 2022/0117271 A1    Apr. 21, 2022

(51) Int. Cl.
A23L 2/80 (2006.01)
A23L 2/02 (2006.01)
A23L 2/385 (2006.01)
A23L 2/56 (2006.01)
A23L 2/64 (2006.01)
A23L 27/10 (2016.01)
C12C 5/02 (2006.01)
C12G 3/06 (2006.01)
C12H 1/056 (2006.01)

(52) U.S. Cl.
CPC ...... *A23L 2/80* (2013.01); *A23L 2/02* (2013.01); *A23L 2/385* (2013.01); *A23L 2/56* (2013.01); *A23L 2/64* (2013.01); *A23L 27/115* (2016.08); *C12C 5/02* (2013.01); *C12G 3/06* (2013.01); *C12H 1/0424* (2013.01)

(58) Field of Classification Search
CPC .. A23L 27/115; A23L 2/56; A23L 2/02; A23L 2/64; A23L 2/80; A23L 2/385; C12C 5/02; C12C 12/04; C12C 5/00; C12H 1/00; C12H 1/0424; C12G 3/06; C12G 3/08; A23F 5/505
See application file for complete search history.

(56) References Cited

U.S. PATENT DOCUMENTS

2009/0155446 A1    6/2009   Reiss et al.

FOREIGN PATENT DOCUMENTS

| CN | 1360624 A | 7/2002 |
| CN | 102907736 A | 2/2013 |
| CN | 103865654 A | 6/2014 |
| DE | 102015119154 A1 | 5/2017 |
| EP | 3351613 A1 | 7/2018 |

OTHER PUBLICATIONS

DE 102015119154 A1 Derwent Acc No. 2017-299563 Equivalent Abstract (Year: 2017).*
International Search Report and Written Opinion dated Apr. 1, 2019 for corresponding PCT Application No. PCT/EP2018/072292.
Reineccius, G.A., "Flavour-Isolation Techniques," Flavours and Fragrances, Chemistry Bioprocessing and Sustainability, Springer, 2007, pp. 418-420 XP055573094.
Chinese Office Action dated Dec. 22, 2022 for corresponding Chinese Application No. 201880096666.8.
Han-Mou Yu et al., "Spinning cone column and its recent application in food and fragrance perfume industry: A review," Science and Technology of Food Industry, vol. 34, No. 24, 2013, Abstract.

* cited by examiner

*Primary Examiner* — Vera Stulii
(74) *Attorney, Agent, or Firm* — POLSINELLI PC

(57) ABSTRACT

The present invention relates primarily to a method for obtaining a volatile fraction from a juice and/or an alcohol-containing beverage, comprising or consisting of the following steps: (a) distilling a mixture of substances from the juice and/or the alcohol-containing beverage, wherein the distillation is performed by a spinning cone column; (b) contacting the mixture of substances from step (a) with a sorbent to obtain a loaded sorbent; and (c) contacting the loaded sorbent from step (b) with a liquid desorbent to obtain the volatile fraction, wherein desired ingredients of the volatile fraction are concentrated as compared to the juice and/or alcohol-containing beverage such that an addition of 0.1% by mass or less of the volatile fraction to any food preparation produces a perceptible odor impression and/or taste impression in a test subject.

21 Claims, No Drawings

OBTAINING A VOLATILE FRACTION FROM JUICES OR ALCOHOLIC BEVERAGES

CROSS-REFERENCE TO RELATED APPLICATIONS

This application is a national stage application (under 35 U.S.C. § 371) of PCT/EP2018/072292, filed Aug. 17, 2018, which is incorporated herein by reference in its entirety.

The present invention relates to a method for obtaining a volatile fraction from a juice and/or an alcohol-containing beverage without partial or complete loss or degradation of valuable ingredients, especially, for example, flavor compounds contained in a volatile fraction. The volatile fraction can be used in a product suitable for consumption or for its production. For example, the volatile fraction can be added to a food concentrate to reconstitute the original flavor.

During food processing, in particular the production of beverages, vegetables and fruit juices, as well as the extraction of foodstuffs, industrially significant quantities of odor- and taste-intensive aqueous solutions are produced which, when concentrated and added as a concentrate, can rearomatize the same foodstuff or flavor other foodstuffs.

Methods for the concentration and fractionation of flavor compounds from foodstuffs are well known in the prior art and include, for example, distillation, membrane processes, adsorption/desorption, extraction with supercritical carbon dioxide and liquid-liquid extraction. For example, during the production of orange juice concentrate, a flavor vapor condensate is obtained which, after concentration, can be added to the orange juice concentrate to reconstitute the flavor.

Due to the increased consumer interest in an authentic taste experience and health-conscious nutrition, existing methods for concentrating aqueous solutions can only be used to a limited extent. For example, distillation can produce cooking notes due to the thermal stress on the aqueous product, which are not regarded as an authentic taste experience. For example, the concentration of strawberry vapor condensates produces cooking notes that remind the consumer of jam and not of eating fresh strawberries.

In addition, the aromatic, aqueous solutions do not represent a chemically uniform substance, but are composed of a large number of different chemical components, which only in their entirety produce the sensory result of the natural flavor of a food. When handling media containing flavor compounds, or when processing foodstuffs, there is therefore a risk that parts of the natural mixture will be lost or degraded, thus reducing or even destroying the natural content. The processes known in the prior art for concentration often lead to an undesirable fractionation of the mixture from the flavoring substances. For example, experience has shown that distillative processes show low recovery of low-volatile flavor compounds. Adsorptive processes discriminate between flavor compounds of different polarity, and membrane processes are recognized to show selectivity towards the retention of flavor compounds according to the membrane properties.

It is therefore important to develop a method that concentrates aqueous solutions to a sufficient degree to impart a sufficiently perceptible odor impression when a concentrate is added to the foodstuff in the per mille range, while retaining value-giving flavor compounds in their original composition.

A further complicating factor is that such a method should be capable of selectively enriching value-adding flavor compounds and depleting or completely removing other undesirable ingredients, such as alcohols and in particular ethanol.

As the proportion of Muslim believers in the world population increases, the demand for alcohol-free products, i.e. products with residual alcohol, especially ethanol, of <0.1%, is growing. Since aqueous fruit phases in particular generally contain ethanol, which can reach two-digit percentages in the concentrate, this must be depleted in comparison with other flavor compounds. In a preferred method, therefore, ethanol cannot be used as an auxiliary mean.

The dealcoholization of beverages also plays an important role in this context, as it makes popular beverages containing alcohol, such as wine, sparkling wine and beer, accessible to a broader group of consumers who have reservations about alcohol consumption, for example, due to a health-conscious diet, legal restrictions or illness.

During dealcoholization, volatile substances are usually separated and, for example, rectification is used to obtain fractions of volatile substances that are depleted in ethanol and returned to the dealcoholized beverage. To date, however, dealcoholized beverages have not achieved an aroma profile similar to that of the original alcoholic beverage. In this case, too, a suitable method must enrich volatile substances in the aqueous alcoholic solution and deplete ethanol.

Spinning cone column (SCC) distillation has been used for a long time in the flavor production of various heat-sensitive foods such as fruit juices, as well as in wine and beer dealcoholization. Since this is a distillative process, less volatile flavor compounds such as 2-phenylethanol (with a rosy aroma and important for beer, for example) are only slightly entrained at temperatures <35° C. If the temperature is increased, for example, the flavor of the wine is reduced. If the temperature is increased to 80° C., for example, to increase the yields of low-volatile substances, main fermentation products such as ethanol and fusel alcohols are also strongly enriched, thereby reducing the concentration of the value-giving flavor substances (Müller et al., "Physical processes for dealcoholization of various beverage matrices and their influence on quality-relevant characteristics", Chemie Ingenieur Technik, Wiley Online Library, Oct. 20, 2016, https://doi.org/10.1002/cite.201600071). For the production of non-alcoholic beverages with less than 0.05% alcohol by volume, which is necessary in Germany for a declaration of a 0.0% alcohol by volume beer, this means a reduction in sensory quality, since the ethanol content limits the amount of value-giving flavor compounds that can be returned.

Main fermentation products such as ethanol and fusel alcohols can also be formed unintentionally in foods during the storage of fruit, for example. During the extraction of flavor concentrates, these are strongly enriched and thus limit the applicability of the flavor concentrates. To solve this problem, WO 2015/001943 A2 describes a method for thawing frozen fruits and extracting the puree with SCC distillation. Since the time between harvest and processing of fruits is critical for the formation of main fermentation products such as methanol, fruits have been snap frozen directly after harvest to allow storage without loss of quality. This method yields a distillate poor in main fermentation products and enriched in value-added flavor compounds. However, freezing and thawing of fruits is a complex, especially costly, method, which also makes rearomatization complex and costly. It is disclosed that it is impossible to separate methanol from aroma fractions without loss of valuable flavor compounds.

WO 2015/104357 A1 describes the separation into permeate containing alcohol and aroma and a nearly alcohol-free retentate (<1% by volume) by nanofiltration with a Dow Filmtech N90 membrane. The permeate to be used for rearomatization is described by fractional distillation or adsorption of the flavor compounds on Purolite Macronet 200. For reconstitution of the dealcoholized wines listed in the examples, aroma fractions are added for flavor reasons, resulting in an alcohol content of 4.3 and 4.8% by volume in the final product. Consequently, the permeate used for rearomatization still contains relevant amounts of ethanol in addition to the value-giving flavor compounds.

The separation of alcohols, which dominate in terms of volume, from other value-giving flavor compounds is thus a technological challenge, and the production of dealcoholized beverages that correspond sensory-wise to the starting material has not been feasible to date.

Therefore, one task of the present invention is to provide a method for obtaining volatile fractions from a juice and/or an alcohol-containing beverage, in which the above-mentioned difficulties preferably do not arise. A further task of the present invention is to provide a method for obtaining volatile fractions from a juice and/or an alcohol-containing beverage, by the use of which odor- and taste-active aqueous as well as aqueous-alcoholic solutions can be concentrated to a sufficiently high degree without loss of value-giving substances and without formation of interfering components, so as to retain the sensory profile of the starting material.

The invention therefore concerns a method for obtaining a volatile fraction from a juice and/or an alcohol-containing beverage. The method according to the invention comprises or consists of the following steps:

(a) distilling a substance mixture from the juice and/or the alcohol-containing beverage, the distillation being carried out by a spinning cone column;

(b) contacting the substance mixture from step (a) with a sorbent to obtain a loaded sorbent; and (c) contacting the loaded sorbent from step (b) with a liquid desorbent to obtain the volatile fraction, wherein desired ingredients of the volatile fraction are concentrated in comparison to the juice and/or the alcohol-containing beverage such that an addition of 0.001 to 0.1% by mass of the volatile fraction to any food preparation, in particular the juice and/or the alcohol-containing beverage, produces a perceptible odor impression and/or taste impression in a test person.

Preferably, only a single spinning cone column is used in the method according to the invention and/or method step (a) is run through only once. Alternatively or additionally, method steps (b) and (c) are also run through only once. This has the advantage that, compared to systems in which, for example, a combination of two or more spinning cone columns is used or one or more method steps of the method according to the invention are run through more than once, costs can be saved or the material and maintenance costs are lower. Alternatively or additionally, the foodstuffs for the aqueous food fraction can be used immediately and do not require any special storage conditions. For example, fruits and/or berries used for the production of a juice can be stored at ambient temperature, e.g. 22 to 32° C., without any sensory impairment of the obtained volatile fraction compared to a freshly obtained (pressed) fruit juice.

Furthermore, the invention relates to a volatile fraction obtained or obtainable by the method according to the invention.

The invention also provides the use of the volatile fraction in a product suitable for consumption or for preparing a product suitable for consumption. Exemplary products suitable for consumption include foodstuffs, preparations for pleasure, beverages, semi-finished goods, oral hygiene and cosmetic or pharmaceutical products.

The invention also provides a product suitable for consumption, preferably selected from the group consisting of foodstuffs, preparations for pleasure, beverages, semi-finished goods, oral hygiene and cosmetic or pharmaceutical products. The product suitable for consumption has an amount of the volatile fraction according to the invention, preferably the total amount of the volatile fraction relative to the total weight of the product suitable for consumption is in the range of 0.001 to 5% by mass, preferably in the range of 0.01 to 1% by mass, more preferably in the range of 0.1 to 0.5% by mass.

Surprisingly, it has been found in the context of the present invention that the combination of a spinning cone column (SCC) distillation followed by a sorption/desorption process, in particular an adsorption/desorption process, resolves the above difficulties and yields the desired ingredients of the volatile fraction concentrated relative to the juice and/or alcohol-containing beverage such that an addition of 0.001 to 0.1% by mass, e.g. 0.0025 to 0.075% by mass, 0.005 to 0.05% by mass, 0.0075 to 0.025% by mass, or 0.01% by mass, of the volatile fraction to any food preparation produces a perceptible odor impression and/or taste impression in a test subject. The combination of a spinning cone column distillation with a sorption/desorption process can further provide near quantitative removal of undesirable ingredients, especially alcohols, including fusel alcohols and especially ethanol. Thus, by combining a spinning column distillation followed by a sorption/desorption process, in particular an adsorption/desorption process, stored fruits/berries, stored vegetables or the juices obtained therefrom with a higher alcohol content caused by fermentation can also be further processed in such a way that a product suitable for consumption obtained therefrom can be declared as alcohol-free.

The term "alcohol-free" as used herein relates to products suitable for consumption, particularly foods and beverages, that contain 0.5% or less, preferably 0.1% or less, 0.01% or less, or even 0.001% or less, alcohol by volume.

The term "juice" as used herein preferably refers to fruit or vegetable juices that are pressed from fruit or vegetables immediately after harvest, e.g., fresh, and may be left for a period of not more than 7 days, e.g., 6 days, 5 days, 4 days, 3 days, 2 days, or 1 day or less after harvest, or pressed for a period of 6 hours to 7 days, e.g., 6 days, 5 days, 4 days, 3 days, 2 days, or 1 day, or 12 hours, after harvest. A juice may thus contain the alcohol necessarily obtained by alcoholic fermentation. In this regard, a "juice" is preferably to be distinguished from an "alcohol-containing beverage" or "alcoholic beverage" in which the alcohol content is (intentionally) produced or increased as part of the production method and has, for example, an alcohol content of 2% by volume or more, such as 5% by volume or more, 10% by volume or more, 15% by volume or more, 30% by volume or more, or 40% by volume or more. Thus, the alcohol content of the "alcohol-containing beverage" generally exceeds the alcohol content of a "juice."

The term "volatile fraction" as used herein relates to a liquid, typically one or more solvent(s), such as for example one or more selected from water, alcohol, especially ethanol and oil, which has as a desired ingredient(s) one or more "flavor compounds" and thus constitutes a flavor concentrate. The term "flavor compounds" as used herein is to be understood broadly to refers to an aroma, a flavor compound, or a fragrance, or combinations thereof, contained in foodstuff, especially in the juice and/or alcoholic beverage. In addition to the desired ingredient(s) or the one or more flavor compound(s), other ingredients are usually present. These further ingredients are usually undesirable ingredients, such as, in the context of the present text, alcohols, in particular fusel alcohols and/or ethanol. A ratio of the undesirable ingredients contained in the volatile fraction, in particular an alcohol, to the sum of desirable ingredients or flavor compounds may be 0.005 to 1000, preferably 0.1 to 20. A ratio of the ethanol contained in the volatile fraction to the sum of flavor compounds V(E/A) may be 0.005 to 1000, preferably 0.1 to 20. The amount of liquid, preferably of a solvent such as water and/or oil, relative to the total volume of the volatile fraction is 30 to 98% by volume, preferably 30 to 98% by volume, 40 to 97% by volume, 50 to 96% by volume, 60 to 95% by volume, 65 to 94% by volume, 70 to 93% by volume, 75 to 92% by volume, 80 to 91% by volume, or 85 to 90% by volume.

The above-mentioned one or more flavor compounds may, on the one hand, be naturally present in many untreated foods and/or may only be formed after mechanical/thermal/enzymatic treatment of foods. For example, the Maillard reaction, in which amine compounds are converted with reducing compounds under the action of heat to form new compounds, or caramelization during the thermal treatment of foods represent reactions that occur. The "volatile fraction" preferably represents the "concentrate" of the aroma, flavor and/or fragrance or combinations thereof, i.e. represents their composition in a food or food preparation, in particular the juice and/or alcohol-containing beverage, such that the food or food preparation, in particular the juice and/or alcohol-containing beverage, in which the aroma, flavor and/or fragrance or combinations thereof are not contained, and is combined with the aroma, flavor and/or fragrance or combinations thereof. combinations thereof are not contained and are mixed with the concentrate, produces the same odor impression and/or taste impression as the food or food preparation, in particular the original, freshly prepared juice and/or the original, freshly prepared alcohol-containing beverage, in a test subject.

An addition of 0.001 to 0.1% by mass of this volatile fraction to any food preparation produces a perceptible odor impression and/or taste impression in a test subject. Thus, a perceptible odor impression and/or taste impression of the flavor compound, i.e., the aroma, flavor and/or fragrance compound, or a combination thereof, is produced in the test subject.

The combination of an aroma, a flavor and/or fragrance may include any number, for example 2 or more, such as 3 or more, 4 or more, 5 or more, 6 or more, 7 or more, 8 or more, 9 or more, or 10 or more, of an aroma, a flavor and/or fragrance. It is clear here that the indefinite article "a" may include a variety of different elements.

Exemplary preferred "volatile fractions" have one or more of the ingredients listed below; strawberry flavor: ethyl butyrate, ethyl methyl butyrate-2, methyl capronate, linalool, gamma-decalactone; raspberry flavor: alpha- and beta-lonone, delta-decalactone, hydroxybenzylacetone, 3Z-hexenol; apple flavor: 2E-hexenol, 3Z-hexenol, 2E-hexenal, hexanal, ethyl butyrate, ethyl methyl butyrate-2, beta-damascenone; orange flavor: ethyl butyrate, methyl butyrate, octanal, hexanal, linalool; grapefruit aroma: nootkatone, ethyl butyrate, linalool, p-menthenthiol-1,8; lemon aroma: citral, geraniol, caryophyllene; cherry aroma: benzaldehyde, 2E-hexenol, 2E-hexenal, hexanal, beta-damascenone; peach flavor: gamma-decalactone, 2E-hexenol, beta-damascenone, linalool oxide; banana flavor: isoamyl acetate; pear flavor: ethyl-2E,4Z-decadienoate; black currant flavor: 8-mercapto-p-menth-1-en-3-one; coffee flavor: beta-damascenone, furfurylthiol-2,4-vinylguaiacol, isomeric Isopropyl-methoxy-pyrazine, isomeric ethyldimethylpyrazine; green tea flavor: 3-Z-hexenol, indol, methyl jasmonate, jasmine lactone; onion flavor: dipropyl disulfide, dipropyl trisulfide, methyl propyl disulfide; meat flavor: 2E,4Z,7Z-tridecatrienal, 2E,5Z-undecadienal, 2E,4Z-decadienal; rice flavor: 2-acetyl-1-pyrroline; octanal, nonanal; milk flavor: 1-octen-3-one, 1-octen-3-ol, 4-ocanolide, 5-octanolide; tomato flavor: 3Z-hexenol, beta-damascenone; mint flavor: l-menthol, menthone, l-carvone; beer flavor: isoamyl acetate, phenylethanol, ethyl butyrate; and wine flavor: wine lactone, menthofurolactone. It is clear that the above ingredients are only exemplary and may vary according to various factors, e.g. species, subspecies, growing, harvesting, storage conditions, etc., or various substances may be replaced by others.

A "food preparation" as used herein refers to any type of food, in particular aqueous food preparations or foods with added water, e.g. purees or porridges, and beverages, in particular juices, e.g. fruit or berry juices, and alcohol-containing beverages, e.g. wine, sparkling wine and beer. It is clear to the skilled person what water content an aqueous food preparation, in particular one containing juice and/or alcohol, has in order to be subjected, for example, to a spinning cone column distillation.

Preferred ethanol-containing foods are, for example, alcoholic beverages as such, or alcoholic beverages in diluted form.

A "spinning cone column" or the "distillation by a spinning cone column" underlying method step (a) relates to a gently carried out distillation process. In this process, lighter-boiling components are extracted in a gas stream which is preferably passed in countercurrent to the liquid food phase. Rotating plates, similar in design to a centrifuge, form conical (heating) surfaces, on the inside of which alcohol-containing product is introduced via the nozzle block and accelerated outward in the form of a thin liquid film by centrifugal forces. The heating vapor (gaseous phase) rises from the bottom of the disk packing through the disk interstices, under constant heat and mass transfer, causing lighter-boiling components to accumulate in the vapor stream and heavier-boiling components to accumulate in the liquid. Turbulent flow conditions for both phases are ensured by fins on the bottom of the plates. The process is characterized by particularly short contact times of, for example, <1 s, preferably <0.1 s, due to centrifugal acceleration and a low thermal load on the products due to the execution under vacuum or a partial vacuum. The distillation can be performed continuously or as a batch distillation. "Distillation by a spinning cone column" is preferably carried out as set forth in DE 36 86 492 T2, the contents of which are incorporated herein by reference in their entirety. Spinning cone columns as such are known to the skilled person and can be obtained e.g. from Flavourtech, Australia, e.g. the SCC 1,000.

The substance mixture obtained by distillation through a spinning cone column is further subjected to a sorption process underlying method steps (b) and a desorption process underlying method steps (c). A "sorption/desorption process" relates to adsorption/desorption processes or absorption/desorption processes known in the prior art, preferably an adsorption/desorption process.

In the adsorptive concentration of aqueous solutions, an aqueous solution, in particular the mixture of substances obtained by distillation through a spinning cone column, is passed through a bed of an ion exchange resin, preferably a porous sorbent surface-modified with organic residues, and the bed is then eluted with a liquid desorbent, preferably water, in particular water vapor, or an aqueous solution, for example an aqueous solution with a small amount of an organic solvent, for example ethanol, compared to the aqueous solution.

Alternatively or additionally, the elution can be carried out with the aid of an aqueous food preparation, in particular the juice and/or the alcohol-containing beverage. The aqueous food preparation, in particular the juice and/or the alcohol-containing beverage, can be used here (a) as such, i.e. undiluted, (b) diluted with a solvent, in particular with water, or (c) in concentrated form. As an exemplary and preferred concentrated form of the aqueous food preparation, in particular the juice and/or the alcohol-containing beverage, the mixture of substances from step (a) and/or the volatile fraction from step (c) may be mentioned here. It can be further advantageous, for example, to use the mixture of substances from step (a) and/or the volatile fraction from step (c) not as such but in combination with one or more selected from the group consisting of a solvent and an aqueous food preparation, in particular the juice and/or the alcohol-containing beverage.

Within the scope of the present invention, in principle, all adsorption materials can be used which are usually employed for adsorption/desorption processes.

A device suitable for holding the adsorption material is usually a column made of glass or stainless steel, the internal volume usually being a few milliliters, e.g. 10 ml, up to 1000 liters, preferably in the range of 1 l to 750 l, such as e.g. 25 l to 500 l, 50 l to 250 l, or 75 l to 100 l.

Preferred adsorption materials used in a column are variously cross-linked polystyrenes, preferably copolymers of ethylvinylbenzene and divinylbenzene, vinylpyrrolidone and divinylbenzene, vinylpyridine and divinylbenzene, styrene and divinylbenzene, but also other polymers, such as preferably polyaromates, poly(meth)acrylates, polypropylene, polyesters, polytetrafluoroethylene, etc. The adsorbent materials may further have surface modifications. Polystyrenes, in particular non-surface-modified, cross-linked macroporous polystyrenes, e.g. LEWAPLUS®, LEWATIT®, LEWABRANE®, BAYOXIDE® (Lanxess, Germany), especially LEWATIT®, such as LEWATIT® VP OC 1064 are particularly preferred.

For the adsorption process, the mixture of substances is preferably used as such, alternatively in combination with a solvent. Exemplary solvents are water or water together with an organic solvent, preferably selected from the group consisting of methanol, ethanol, propanol, n-propanol, i-propanol, ethyl acetate, diacetin, triacetin, liquid carbon dioxide, food-grade fluorochloro hydrocarbons and vegetable triglycerides.

Preferably, a spinning cone column distillate is used as the ethanol-containing solvent. Here, step (b) of the method according to the invention comprises contacting a first portion of the mixture of substances from step (a) with a sorbent to obtain a loaded sorbent, and using a second portion of the mixture of substances from step (a) as the liquid desorbent or a component thereof. Even more preferably, the second portion of the mixture of substances of step (a) is only a component of the liquid desorbent, the one or more other components of the liquid desorbent comprising a solvent and/or the aqueous food preparation, in particular a juice and/or an alcohol containing beverage. For example, the first portion may be 50 to 90% by mass, for example 60 to 80% by mass, such as 70% by mass, the second portion may be 10 to 50% by mass, for example 20 to 40% by mass, such as 30% by mass, in each case based on the total volume of the mixture of substances from step (a). The second portion is preferably mixed with a solvent and/or the aqueous food preparation, in particular the juice and/or the alcohol-containing beverage, more preferably in a mass ratio of 4:1 to 1:4, for example 3:1 to 1:3, 2:1 to 1:2, or 1:1, and used as the liquid desorbent.

The flow velocity of the substance mixture as such, alternatively in combination with a solvent, can be 0.2 to 10 cm/s at least partially during the adsorption process. In this context, the parameter of the flow velocity is partly responsible for the formation of the local partition coefficients of the one or more flavor and/or fragrance substances between the adsorbent material and the water phase. Preferably, the flow velocity is in the range of 0.5 to 9 cm/s, 0.75 to 8 cm/s, 1.0 to 7 cm/s, 1.5 to 6 cm/s, 2.0 to 5 cm/s, 2.5 to 4 cm/s, or 3.0 to 3.5 cm/s. The skilled person is familiar with the suitable conditions.

Columns used for adsorption/desorption have, for example, a column size or column volume (BV) of 0.1 l to 500 l, such as 20 l or 300 l, for example. The ratio of the inner diameter to the length or height of these columns is preferably 0.05 to 0.5, such as 0.1 to 0.4, or 0.2 to 0.3. More preferably, columns are used that have the aforementioned column volume and/or ratio of inner diameter to column length or height. An exemplary, particularly preferred column has a column size or column volume (BV) of 300 l, an inner diameter of 0.51 m and a length or height of 1.45 m. The temperature of the substance mixture as such, alternatively in combination with a solvent, is in the range of 0° C. to 70° C. during the adsorption process, preferably 10° C. to 50° C., such as 20° C. to 35° C., or 25° C. to 30° C., for example. The temperature is also partly responsible for the formation of the local partition coefficient.

The back pressure during the adsorption process can be 0.1 bar to 4.0 bar and can be determined, for example, with a conventional pressure gauge. The back pressure during the adsorption process is the pressure that results from the resistance of the adsorption material when the substance mixture as such, or alternatively in combination with a solvent, is pumped through the column packed with adsorption material. Preferred is a back pressure in the range of 0.3 bar to 2.5 bar, especially preferred 0.8 bar to 1.5 bar.

For desorption, the flow rate of the selected liquid desorbent can be 0.1 to 20.0 column volume/hour (BV/h), e.g. 0.2 to 15.0 BV/h, 0.3 to 12.0 BV/h, 0.4 to 11.0 BV/h, 0.5 to 10.0 BV/h, 0.6 to 9.0 BV/h, 0.7 to 8.0 BV/h, 0.9 to 7.0 BV/h, 1.0 to 6.0 BV/h, 1.25 to 5.0 BV/h, 1.5 to 4.0 BV/h, 1.75 to 3.5 BV/h, 2.0 to 3.0 BV/h, 2.25 to 2.75 BV/h, or 2.5 BV/h. The temperature of the liquid desorbent is usually 0° C. to 70° C., preferably 10° C. to 50° C., such as 20° C. to 35° C., or 25° C. to 30° C., but may be higher during thermodesorption, for example, at a temperature of 90 to 200° C. The temperature is also partly responsible for the formation of the local partition coefficient.

The total volume of the selected liquid desorbent used in desorption is usually 0.2 to 5.0 column volume (BV), for example, 0.3 to 4.5 BV, 0.4 to 4.0 BV, 0.5 to 3.5 BV, 0.6 to 3.0 BV, 0.7 to 2.5 BV, 0.8 to 2.0 BV, 0.9 to 1.5 BV, or 1 BV.

The back pressure during the desorption process can be 0.05 bar to 2.0 bar and can be determined, for example, with a conventional pressure gauge. The back pressure during the desorption process is the pressure that arises due to the resistance of the adsorbent material when the liquid desorbent is pumped through the column packed with adsorbent material. Preferably, the backpressure is in the range of 0.1 bar to 1.0 bar, more preferably 0.2 bar to 0.5 bar.

The directions of the adsorption process and the desorption process can be in the same direction or opposite.

The sorption process and/or the desorption process is preferably carried out as set forth in EP 2 075 320 A1, the contents of which are incorporated herein by reference in their entirety.

More preferably, only the sorption process is carried out as set forth above, particularly with respect to EP 2 075 320 A1. In particular, thermal desorption or thermodesorption is used as the desorption process.

Surprisingly, it has been shown that thermal desorption in particular—a process considered unsuitable for concentrating ingredients in the prior art due to a high thermal load on ingredients—is a cost-effective desorption process, whereby the desired ingredients can be obtained in high quantity compared to the total quantity of undesired ingredients, in particular ethanol. Thermal desorption can therefore not only be used for analytical purposes, but is also suitable for the isolation of desired ingredients, in particular flavor compounds, on a (large) technical or industrial scale. Another advantage is that, compared to conventional desorption, lower volumes can be used for elution in thermal desorption, such as 0.2 to 3.0 BV/h, 0.5 to 2.0 BV/h, or 1 to 1.5 BV/h, for example.

In thermal desorption, elution can be performed with inert gases, for example nitrogen, carbon dioxide, helium, neon, and argon, as well as heated solvent, in particular heated water, without pressure as well as under pressure. Alternatively, a combination of the above desorbents or eluents can be used.

In thermal desorption, heated solvent, e.g. heated water, is preferably supplied to the loaded sorbent via a pump system, in particular a steam line system after setting a constant pressure and/or temperature. Alternatively, heated water can be provided merely by heating the residual water at the loaded sorbent.

In thermal desorption, e.g., water vapor desorption with heated water, temperature gradients usually occur in the sorbent/adsorber charge, i.e., in the direction of flow of the hot water vapor, or radially from the outside during active heating of the column shell, as well as starting from further heating zones contained on or in the container for the loaded sorbent, preferably a column. Usually, a fast elution of the volatile fraction is desirable, possibly also necessary, in order to prevent a thermal degradation of the desired ingredients, i.e. of an aroma, a flavor and/or a fragrance or a combination thereof, at least partially or completely. A fast elution or a low temperature of the water vapor can further contribute to the avoidance of undesired side reactions and the possibly occurring development/emergence of undesired substances.

Rapid elution is preferably achieved by the solvent vapor, in particular water vapor, penetrating the adsorber filling as quickly as possible by varying the pressure/temperature. This depends, among other things, on factors such as the sorbent selected, in particular its chemical nature, particle dimensions or their distribution, bulk density, and the container intended to hold the sorbent, in particular a column. It is evident that these factors are either familiar to the skilled person or can be determined without further effort. Alternatively or additionally, one or more heating systems, e.g. one or more microwave-based heating systems, can be provided in the container intended to hold the sorbent, in particular a column, which distribute the water vapor as quickly and uniformly as possible over the loaded sorbent/adsorber charge.

Preferably, steam is used at a temperature of 90 to 200° C., preferably 92 to 180° C., 94 to 160° C., 96 to 140° C., 98 to 130° C., more preferably 100 to 120° C., such as 102° C. to 118° C., 104° C. to 116° C., 106° C. to 114° C., 108° C. to 112° C., or 110° C. The pressure used is 1 to 25 bar, such as 1.2 to 15 bar, 1.4 to 10 bar, 1.6 to 8 bar, 1.8 to 6 bar, preferably 2.0 to 5 bar, such as 2.5 to 4.5 bar, 3 to 4 bar, or 3.5 bar.

Complete desorption can be performed with a total volume of desorbent equal to 1 to 15 times, preferably 2 to 10 times, such as 3 to 9 times, 4 to 8 times, 5 to 7 times, or 6 times, the column volume.

The condensation of the water vapor can take place at −200 to +20° C., such as −150 to 15° C., −100 to 10° C., −50 to 5° C., preferably at −20 to 0° C.

In thermal desorption with a solvent other than water or a solvent-water mixture, the same conditions listed above can be used. It is clear to the person skilled in the art that other solvents may require different temperatures for steam generation.

The term "fusel alcohol" as used herein refers to the accompanying alcohols known in (legal) medicine, such as methanol, n-propanol, butanols, amyl alcohols and hexanol.

According to a preferred embodiment of the present invention, the spinning cone column distillation is carried out as a countercurrent distillation at a pressure of 1 to 500 mbar.

It has been found that by performing the distillation as a countercurrent distillation at a pressure of 1 to 500 mbar, the efficiency of the separation of the volatiles can be increased. Preferably, the pressure is 5 mbar to 450 mbar, such as 10 mbar to 400 mbar, 15 mbar to 350 mbar, 20 mbar to 300 mbar, 25 mbar to 250 mbar, 30 mbar to 200 mbar, 35 mbar to 150 mbar, 40 mbar to 100 mbar, 45 mbar to 90 mbar, 50 mbar to 80 mbar, or 60 mbar to 70 mbar.

According to another preferred embodiment of the present invention, the countercurrent distillation is performed with a gas, wherein the gas is an inert gas, preferably nitrogen, carbon dioxide, a noble gas, e.g. helium, neon, or argon, or a mixture thereof. More preferably, one or more of nitrogen, helium, or neon is used. Nitrogen is particularly preferred.

According to still another preferred embodiment of the present invention, a stripping ratio is 1-10:1, preferably 2-9:1, such as 3-8:1, 4-7:1, or 5-6:1, return flow to clearance.

"Stripping" or "stripping" as used herein relates to the transfer of compounds from a liquid phase to the gas phase by desorption processes. For this purpose, in spinning cone column distillation, the liquid phase is contacted in a countercurrent manner with a gas, preferably one of the inert gases listed above, preferably nitrogen.

According to a preferred embodiment of the present invention, the aqueous solution has a temperature of 28 to 70° C., preferably 30 to 60° C., more preferably 32 to 50° C.

Preferably, the evaporation rate is increased by increasing the temperature and decreasing the stripping ratio to such an extent that there is no decrease in sensory quality. This allows the best possible yield to be achieved. The flow rate of the product and the gas depends on the column size and the pressure drop. The gas used is an inert gas, such as nitrogen, to reduce oxidation and thus the formation of interfering components.

More preferably, when carrying out step (a) distillation of a mixture of substances from the juice and/or the beverage containing alcohol, wherein the distillation is carried out by a spinning conical column, the temperature is basically 80° C., such as 75° C., or 70° C. This can effectively prevent the decomposition/degradation of the mixture of substances or components thereof. Even more preferably, the entire method according to the invention is carried out at a temperature of 80° C., such as 75° C., or 70° C.

Preferably, a ratio of an amount of the distillate obtained to the amount of the juice and/or alcohol-containing beverage used is 1:10 to 1:200, such as 1:20 to 1:150, 1:30 to 1:100, or 1:40 to 1:90.

According to another preferred embodiment of the present invention, the liquid desorbent is an alcohol-free solvent, preferably water or water vapor.

A preferred alcohol-free solvent is water or water containing 5% by mass or less, 1% by mass or less, 0.1% by mass or less, 10-2% by mass or less, of an organic alcohol-free substance. A particularly preferred alcohol-free solvent used as a liquid desorbent is water vapor.

It is clear that the present invention is not limited to alcohol-free solvents, but rather solvents containing alcohol, in particular solvents containing ethanol, e.g. ethanol-water mixtures, can be used. This can be the case, for example, if the volatile fraction is obtained from an alcohol-containing beverage and is later added to it to obtain a (possibly different) alcohol-containing beverage.

According to still another preferred embodiment of the present invention, the sorbent is a porous solid surface-modified with organic residues, preferably a polystyrene. Other sorbents are as set forth above.

According to a preferred embodiment of the present invention, the mixture of materials has a plurality of components, wherein the loaded sorbent has all of the plurality of components.

According to another preferred embodiment of the present invention, the food preparation is the juice and/or the alcoholic beverage.

Alternatively, the food preparation provides a fraction of the method according to the invention in which the flavor(s) are depleted. Thus, the volatile fraction at least partially, preferably completely, restores the aroma, flavor or fragrance, or a combination thereof, of a correspondingly depleted juice and/or alcoholic beverage.

Preferably, the juice is a juice selected from the group consisting of fruit juice, berry juice and vegetable juice, and/or the alcohol-containing beverage is selected from the group consisting of wine, wine-containing beverages, e.g. sparkling wine, beer and beer-containing beverages. More preferably, the fruit and/or berry of the juice is selected from the group consisting of citrus (*Citrus aurantium*), in particular lemon, orange (deutsch: Orange), orange (deutsch: Apfelsine), tangerine, clementine, grapefruit (deutsch: Grapefruit), grapefruit (deutsch: Pampelmuse), lime, sweet lime, kumquat, tangor and tangelo, melon, kiwi, *papaya*, avocado, acerola, bearberry, blackberry, blueberry, boysenberry, cherry, virgin grape cherry, cloudberry, red and black currant, date, scratchberry (*Rubus caesius*), elderberry, grape, gooseberry, huckleberry, loganberry, olallieberry, mulberry, raisin, plains berry, prairie berry, cranberry, raspberry, Pear, Splendid Raspberry (*Rubus spectabilis*), Buckthorn Fruit, Sloe Fruit, Strawberry, White Cinnamon Raspberry (*Rubus parviflorus*), Buckthorn Fruit, Grape Berry, Blueberry, Apple, Rhubarb, Passion Fruit, Plum, ex. Plum, mirabelle, apricot, nectarine, quince, kiwi, star fruit, lychee, pineapple, guava, *papaya*, passion fruit and mango and peach. More preferred is the vegetable of the juice selected from the group consisting of carrot, tomato, cucumber, radish, beet, sauerkraut, celery and spinach.

Further aromas, flavors and/or fragrances, combinations thereof, or foods, in particular beverages, containing such aromas, flavors and/or fragrances may be found, for example, in DE 10 2016 105 997 A1, the contents of which are incorporated herein by reference in their entirety.

The fruit and/or berry on which the juice is based may be stored for production-related reasons, preferably for a period of 6 to 48 hours, e.g. 12 to 36 hours, 18 to 30 hours, or 24 hours, without the volatile fraction being impaired in sensory terms with regard to the foodstuff on which the aqueous food preparation is based, e.g. by fermentation processes occurring during storage. The same applies to other foodstuffs, e.g. foodstuffs which are used as aqueous food preparation in the context of a porridge or puree.

According to still another preferred embodiment of the present invention, the volatile fraction comprises one or more aromas and/or odors/flavors/combinations thereof, preferably all, of the alcohol-containing food preparation.

According to another preferred embodiment of the present invention, a ratio of ethanol contained in the volatile fraction to the sum of flavor compounds $V(E/A)$ is 0.005 to 20, preferably 0.1 to 10.

A lowest possible $V(E/A)$ of e.g. 0.005 to 20, preferably 0.1 to 10, is generally preferable. Alternatively, the volatile fraction from the juice and/or alcohol-containing beverage can likewise be recovered with an ethanol/total flavor compounds ratio ($V(E/A)$) of 0.005 to 1000, such as 5 to 500, preferably 10 to 100, e.g. 20 to 90, 30 to 80, 40 to 70, or 50 to 60.

The volatile fraction may have a $V(E/A)$ of, for example, 0.5 to 20, such as 1 to 15, preferably 2 to 10, such as 3 to 9, 4 to 8, 5 to 7, or 6, when desorbed ethanolically, i.e., with an alcohol-containing desorbent.

In thermal desorption, especially water vapor desorption, a $V(E/A)$ of 0.005 to 20, e.g., 0.01 to 10, preferably 0.1 to 1, e.g., 0.2 to 0.9, 0.3 to 0.8, 0.4 to 0.7, or 0.5 to 0.6, can be obtained. In this context, it was surprisingly found that similar good or even better elution properties can be obtained by thermal desorption with an alcohol-free desorbent, especially water vapor desorption, than by an alcohol-containing desorbent.

Thermal desorption with an alcohol-free desorbent can generally achieve, in addition to an (inherently) lower $V(E/A)$, likewise a higher yield of desired ingredients/flavor compounds compared to desorption at a temperature below 70 to 80° C., e.g. ambient temperature.

A low ratio of alcohol, especially ethanol, to a flavor, taste, fragrance, or combination thereof is favored by a low total volume for desorption/elution of, for example, 0.2 to 1 BV, 0.3 to 0.9 BV, 0.4 to 0.8 BV, 0.5 to 0.7 BV, or 0.6 BV. Preferably, therefore, such a low total volume is used.

Thus, the desired ingredients, in particular flavor compounds, are enriched compared to ethanol and it is possible to dose 1-500 mg/kg preferably 10-200 mg/kg of flavor compounds to the food product without exceeding an ethanol content of 0.05% by mass, corresponding to 500 mg/kg, in the final application, in particular the product suitable for consumption according to the invention.

According to a preferred embodiment of the present invention, the volatile fraction according to the invention is used in a product suitable for consumption, preferably selected from the group consisting of foodstuffs, preparations for pleasure, beverages, semi-finished goods, oral hygiene and cosmetic or pharmaceutical products.

According to another preferred embodiment of the present invention, the volatile fraction according to the invention is used for the preparation of a product suitable for consumption, preferably a food, preparation for pleasure, beverage, semi-finished product, oral hygiene product, cosmetic product or pharmaceutical product.

According to the present invention, a product suitable for consumption is preferably a foodstuff, preparation for pleasure and/or beverage intended to be introduced into an oral cavity, to remain there for a certain time and then either to be swallowed, i.e. consumed (e.g. foodstuff), or to be removed again from the oral cavity, such as chewing gum. It also includes any substance or product intended to be ingested by humans or animals in a processed, partially processed or unprocessed state. In this respect, it also includes all substances that are added to the food during its production, processing or treatment. Products suitable for consumption can be used not only for human consumption, but also in the context of animal husbandry or care. An exemplary product suitable for consumption is a feed.

Chewing gums generally consist of a chewing gum base, i.e. a chewing mass that becomes plastic when chewed, of sugar in various forms, sugar substitutes, sweeteners, sugar alcohols, humectants, thickeners, emulsifiers, encapsulated and/or non-encapsulated flavors and/or stabilizers. In addition to traditionally used natural resins or the natural latex chicle, common chewing gum bases today mostly comprise elastomers such as polyvinyl acetates (PVA), polyethylenes, (low or medium molecular weight) polyisobutenes (PIB), polybutadiene, isobutene-isoprene copolymers (butyl rubber), polyvinyl ethyl ether (PVE), polyvinyl butyl ether, copolymers of vinyl esters and vinyl ethers, styrene-butadiene copolymers (styrene-butadiene rubber, SBR) or vinyl elastomers, e.g. based on vinyl acetate. based on vinyl acetate/vinyl laurate, vinyl acetate/vinyl stearate or ethylene/vinyl acetate, as well as mixtures of these elastomers, as described for example in EP 0242 325, U.S. Pat. Nos. 4,518,615, 5,093,136, 5,266,336 5,601,858 or 6,986,709. In addition, chewing gum bases comprise further ingredients such as (mineral) fillers, plasticizers, emulsifiers, antioxidants, waxes, fats or fatty oils, such as hydrogenated vegetable or animal fats, mono-, di- or triglycerides. Suitable (mineral) fillers are, for example, calcium carbonate, titanium dioxide, silicon dioxide, talc, aluminum oxide, dicalcium phosphate, tricalcium phosphate, magnesium hydroxide and mixtures thereof. Suitable detackifiers include lanolin, stearic acid, sodium stearate, ethyl acetate, diacetin (gylcerol diacetate), triacetin (gylcerol triacetate), and triethyl citrate. Suitable waxes include kerosene waxes, candelilla wax, carnauba wax, microcrystalline waxes, and polyethylene waxes. Suitable emulsifiers are, for example, phosphatides such as lecithin, mono- and diglycerides of fatty acids, e.g. glycerol monostearate.

Preferred flavored products suitable for consumption (food, beverages) are selected from the group consisting of bakery products, preferably selected from the group consisting of bread, dry cookies, cakes and other pastries; confectionery products, preferably selected from the group consisting of chocolate bars, chocolate bar products, other bar products, fruit gums, hard and soft caramels and chewing gum; alcoholic or non-alcoholic beverages, preferably selected from the group consisting of coffee, tea, wine, wine-based beverages, beer, beer-based beverages, liqueurs, spirits, brandies, fruit-based sodas, isotonic beverages, soft drinks, nectars, fruit and vegetable juices, and fruit or vegetable juice preparations; Instant beverages, preferably selected from the group consisting of instant cocoa beverages, instant tea beverages, and instant coffee beverages; meat products, preferably selected from the group consisting of ham, fresh or raw sausage preparations, and seasoned or marinated fresh or cured meat products; Eggs or egg products, preferably selected from the group consisting of dried egg, egg white, and egg yolk; cereal products, preferably selected from the group consisting of breakfast cereals, granola bars, and pre-cooked ready-to-eat rice products; Dairy products, preferably selected from the group consisting of dairy beverages, dairy ice cream, yogurt, kefir, cream cheese, soft cheese, hard cheese, dry milk powder, whey, butter, buttermilk, and partially or wholly hydrolyzed milk protein-containing products; Products made from soy protein or other soybean fractions, preferably selected from the group consisting of soy milk and products made therefrom, preparations containing soy lecithin, fermented products such as tofu or tempeh or products made therefrom, and soy sauces; fruit preparations, preferably selected from the group consisting of jams, fruit ice cream, fruit sauces and fruit fillings; Vegetable preparations, preferably selected from the group consisting of ketchup, sauces, dried vegetables, frozen vegetables, pre-cooked vegetables, pickled vegetables, and preserved vegetables; snack items, preferably selected from the group consisting of baked or fried potato chips or potato dough products, bread dough products, and corn- or peanut-based extrudates; fat and oil based products or emulsions thereof, preferably selected from the group consisting of mayonnaise, tartar sauce, dressings and seasonings; other prepared meals and soups, preferably selected from the group consisting of dry soups, instant soups, pre-cooked soups, spices, seasoning blends and seasonings, such as those used in snacking. used, for example, in the snack sector. The total proportion of flavor concentrates according to the invention and their preferred embodiments in a product (suitable for consumption) according to the invention is, depending on the product type, regularly in the range from 0.001 to 10,000 ppm, preferably in the range from 0.01 to 100 ppm in the final application.

Products suitable for consumption can also include products that are used in the context of animal housing or animal care, e.g. as animal feed.

The products suitable for consumption within the meaning of the present invention can also be used as semi-finished goods for the production of further products (suitable for consumption) according to the invention, preferably foodstuffs, preparations for pleasure and/or beverages. In this case, the semi-finished goods according to the invention are used as finished goods for flavoring products made therefrom. The total proportion of the odorants and/or flavorings/flavors/combinations thereof obtained in the method according to the invention in a semi-finished product according to the invention is, depending on the product type, regularly in the range from 0.01 to 10000 ppm, preferably in the range from 0.02 to 200 ppm.

Cosmetic or pharmaceutical preparations according to the invention can also be formulated as emulsions of the "water-in-oil" (W/O) type, of the "oil-in-water" (O/W) type, or multiple emulsions, e.g. of the type water-in-oil-in-water (W/O/W), PIT emulsion, Pickering emulsion, micro emulsion or nano emulsion; particularly preferred emulsions are of the type "oil-in-water" (O/W), or of the type "water-in-oil-in-water" (W/O/W). The cosmetic preparations according to the invention can further be formulated in particular as, stick, stick, aerosol, spray, sprayable emulsions, foam, impregnating solution, e.g. for cosmetic wipes, cleansing agents such as cleansing milk, cleansing lotions on aqueous, alcoholic or glycolic basis, soap, syndets, skin care products, cream, lotion, milk, emulsion foam, micro-, or nanoemulsion, paste, gel (e.g. gel), balm, serum, roll-on, pump spray, aerosol (foaming, non-foaming or post-foaming), skin care product, foot care product (including keratolytics, deodorants), insect repellent, aftersun product, shaving product, hair removal product, hair care product such as shampoo, 2-in. e.g. shampoo, 2-in-1 shampoo, anti-dandruff shampoo, baby shampoo, shampoo for dry scalp, shampoo concentrate, conditioner, hair treatment, hair tonic, hair conditioner, styling cream, perming and fixing agent, hair smoothing agent (detangler, relaxer), hair setting agent (spray), styling agent (e.g. gel), as blonde agent (e.g. gel). gel), as bleaching agent, hair lightener, hair conditioner, hair mousse, hair tint, deodorant and/or antiperspirant; mouthwash and oral irrigator, aftershave balm, pre- and aftershave lotion, eye care, make-up, make-up remover, baby products, bath products (e.g. capsule), or mask.

In the present invention, oral hygiene products are understood to mean formulations commonly used by those skilled in the art for cleaning and caring for the oral cavity and pharynx and for freshening the breath. Known and common oral hygiene formulations are creams, gels, pastes, foams, emulsions, suspensions, aerosols, sprays as well as capsules, granules, pastilles, tablets, sweets or chewing gums, without this list of dosage forms being limiting with regard to the possible applications. Such formulations are used to clean and care for the tooth structure and oral cavity and to freshen the breath.

Oral hygiene products according to the invention are preferably selected from the group consisting of: Toothpastes, toothpastes, tooth gels, mouthwashes, mouth rinses, liquids for gargling, oral or pharyngeal sprays (pump or aerosol spray), lozenges, lozenges, candies, chewing gums, chewy candies and dental care chewing gums.

Further preferred oral hygiene products are selected from the group consisting of toothpastes, toothpastes, tooth gels, oral or pharyngeal sprays (pump or aerosol spray), lozenges, lozenges, candies, chewing gums, chewing candies and dental care chewing gums.

Dental care preparations (as an example of oral care preparations according to the invention) generally comprise an abrasive system (grinding or polishing agent), such as silicas, calcium carbonates, calcium phosphates, aluminum oxides and/or hydroxylapatites, surface-active substances such as sodium lauryl sulfate, sodium lauryl sarcosinate and/or cocamidopropyl betaine, humectants such as glycerol and/or sorbitol. and/or sorbitol, thickeners such as carboxymethyl cellulose, polyethylene glycols, carrageenan and/or Laponite®, sweeteners such as saccharin, flavor correctors for unpleasant tastes, flavor correctors for other, usually not unpleasant, tastes, taste-modulating substances (e.g., inositol phosphate, nitric acid, sodium lauryl sulfate, sodium lauryl sulfate, sodium lauryl sarcosinate, cocamidopropyl betaine, sodium lauryl sulfate, sodium lauryl sarcosinate and/or cocamidopropyl betaine), inositol phosphate, nucleotides such as guanosine monophosphate, adenosine monophosphate or other substances such as sodium glutamate or 2-phenoxypropionic acid), cooling agents such as menthol derivatives (e.g. L-menthyl lactate, L-menthyl alkyl carbonates, menthone ketals, menthane carbon amides), 2,2,2-trialkyl acetic acid amides (e.g., 2,2-diisopropyl propionic acid methyl amide), icilin and icilin derivatives, stabilizers, and active ingredients such as sodium glutamate or 2-phenoxypropionic acid. such as sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavors and/or sodium bicarbonate or odor correctors.

The total proportion of odorants and/or aromas/flavors/combinations thereof obtained in the method according to the present invention in an oral hygiene product according to the present invention is, depending on the product type, regularly in the range from 0.001 to 10,000 ppm, preferably in the range from 0.1 to 1,000 ppm.

Products in the sense of the present invention, preferably pharmaceutical products, can also be in the form of capsules, tablets (non-coated as well as coated tablets, e.g. with enteric coatings), coated tablets, granules, pellets, solid mixtures, dispersions in liquid phases, as emulsions, as powders, as solutions, as pastes or as other preparations which can be swallowed or chewed, or as food supplements.

As further ingredients for the products according to the invention, in particular foodstuffs, preparations for pleasure, beverages, semi-finished goods, oral hygiene, cosmetic or pharmaceutical products, conventional basic substances, auxiliary substances and/or additives are used. Preferably, these additional ingredients are selected from the group consisting of water, mixtures of fresh or processed, vegetable or animal raw materials, digestible or non-digestible carbohydrates (e.g. (e.g. sucrose, maltose, fructose, glucose, dextrins, amylose, amylopectin, inulin, xylans, cellulose), sugar alcohols (e.g. sorbitol, mannitol, xylitol), natural or hydrogenated fats (e.g. tallow, lard, palm fat, coconut fat, hydrogenated vegetable fat), fatty oils (e.g. sunflower oil, peanut oil, peanut oil). sunflower oil, peanut oil, corn oil, safflower oil, olive oil, walnut oil, fish oil, soybean oil, sesame oil), fatty acids or their salts (e.g. potassium stearate, potassium palmitate), proteinogenic or non-proteinogenic amino acids and related compounds (e.g. taurine, creatine, creatine). taurine, creatine, creatinine), peptides, native or processed proteins (e.g. gelatine), enzymes (e.g. peptidases, glucosidases, lipases, proteinases), nucleic acids, nucleotides (inositol phosphate), taste-modulating substances (e.g. sodium glutamate, 2-potassium glutamate, 2-potassium glutamate, 2-potassium glutamate, 2-potassium glutamate). (e.g. sodium glutamate, 2-phenoxypropionic acid), emulsifiers (e.g. lecitins, diacylglycerols), stabilizers (e.g. carrageenan, alginate, locust bean gum, guar gum), preservatives (e.g. benzoic acid, sorbic acid), antioxidants (e.g. tocopherol, ascorbic acid). (e.g. tocopherol, ascorbic acid), gelators (e.g. citric acid), organic or inorganic acidifiers (malic acid, acetic acid, citric acid, tartaric acid, phosphoric acid), bittering agents (e.g. quinine, caffeine, limonine), sweeteners (e.g. saccharin, cyclamate, citric acid). (e.g. saccharin, cyclamate, aspartame, neotame, neohesperidine dihydrochalcone), mineral salts (e.g. sodium chloride, potassium chloride, magnesium chloride, sodium phosphates), substances that prevent enzymatic browning (e.g. sulphite, ascorbic acid, calcium sulphate). sulfite, ascorbic acid), essential oils, plant extracts, natural or synthetic colorants or color pigments (e.g. carotenoids, flavonoids, antocyanins, chlorophyll and their derivatives, spices, and fragrances, synthetic, natural or nature-identical flavors and/or fragrances.

The products according to the invention, in particular foodstuffs, preparations for pleasure, beverages, semi-finished goods, oral hygiene, cosmetic or pharmaceutical products, preferably oral hygiene products, preferably comprise one or more basic, auxiliary and/or additive substances from the following group: preservatives, abrasives, further antibacterial agents, anti-inflammatory agents, anti-irritant agents, anti-irritant agents, further antimicrobial agents, antioxidants, astringents, antistatic agents, binders, (mineral) fillers, buffers, carrier materials, chelators (chelating agents), cleansing agents, conditioning agents, surface-active substances, deodorizers, emulsifiers, enzymes, fibers, film-forming substances, fixatives, foaming agents, antifoaming substances, foam stabilizers, foam boosters, gelling agents, gelling agents, moisturizers, moisturizing substances, moisture-retaining substances, bleaching agents, lightening agents (e.g., hydrogen peroxide), impregnating agents, friction reducing agents, lubricants, odor and/or taste modulating agents, odor and/or taste reducing agents, odor and/or taste enhancing agents, opacifiers, plasticizing agents, opacifying agents, brighteners, silicones, (mucous) skin cooling agents (cooling agents), (mucous) skin soothing agents, (mucous) skin cleansing agents, (mucous) skin care agents, (mucous) skin healing agents, mucous protecting agents, UV filters, stabilizers, suspending agents, vitamins, fatty oils, waxes, fats, phospholipids, saturated fatty acids, mono- or polyunsaturated fatty acids, alpha-hydroxy acids, polyhydroxy acids, liquefiers, dyes, color-protecting agents, pigments, surfactants, electrolytes, silicone derivatives, polyols, organic solvents, silicas, calcium carbonate, calcium hydrogen phosphate, aluminum oxide, fluorides, zinc, tin, potassium, sodium and strontium salts, pyrophosphates, hydroxyapatites.

If the product preparation according to the invention is a solution or lotion, the following can be used as solvents, for example: water or aqueous solutions, oils, such as triglycerides of capric or caprylic acid or also alcohols, diols or polyols of low C-number, e.g. linear C3- to C8-polyols, as well as their ethers, preferably ethanol, isopropanol, propylene glycol, glycerol, ethylene glycol. In particular, mixtures of the above solvents are used.

Product preparations according to the invention, preferably those intended for use as dental and/or oral care products, are preferably free of cariogenic substances, in particular free of sucrose, glucose, lactose, hydrolyzed lactose, sorbose, arabinose, xylose, mannose, maltose, galactose, maltotriose and/or fructose.

In a further preferred embodiment, the products according to the invention, in particular foodstuffs, preparations for pleasure, beverages, semi-finished goods, oral hygiene, cosmetic or pharmaceutical products, comprise further flavors and/or fragrances.

These further flavors and/or fragrances include, for example, (mucous) cooling agents, (mucous) warming agents, pungent-tasting substances, sweeteners, sugar substitutes, organic or inorganic acidifying agents (e.g. malic acid, acetic acid, citric acid, tartaric acid, phosphoric acid), bittering agents (e.g., quinine, caffeine, limonine, amarogentin, humolones, lupolones, catechins, tannins), and consumable mineral salts (e.g., sodium chloride, potassium chloride, magnesium chloride, sodium phosphates).

Suitable sugar substitutes that can be a component of the preparations according to the invention are sugar alcohols such as mannitol, sorbitol and sorbitol syrup, isomalt (e.g. Palatinit®), maltitol and maltitol syrup, lactitol, xylitol, erythritol, leucrose, arabinol, arabitol, adonitol, alditol, ducitol, Iditol, but also fructooligosaccharides (e.g. Raftilose®), oligofructose or polydextrose.

Typical sweeteners that can be a component of the products of the invention are saccharin (optionally as Na, K or Ca salt), aspartame (e.g. NutraSweet® cyclamate (optionally as Na or Ca salt), acesulfame-K (e.g. Sunett®), thaumatin or neohesperidin dihydrochalcone. Furthermore, other sweeteners such as stevioside, rebaudioside A, glycyrrhizin, ultrasweet, osladin, brazzein, miraculin, pentadin, phyllodulcin, dihydrochalcones, arylureas, trisubstituted guanidines, glycyrrhizin, superaspartame, suosan, sucralose (trichlorogalactosaccarose, TGS), alitame, monelline or Neotame® can also be used.

Preferred pungent-tasting substances and/or substances stimulating salivation in the mouth and/or substances evoking a feeling of warmth and/or a tingling sensation on the skin or on the mucous membranes, which may be components of the products according to the invention, are, for example: capsaicin, dihydrocapsaicin, gingerols, paradols, shogaols, piperine, carboxylic acid-N-vanillylamides, in particular nonanoic acid-N-vanillylamide, pellitorin or spilanthol, 2-nonenoic acid amides, in particular 2-nonenoic acid-N-isobutylamide, 2-nonenoic acid-N-4-hydroxy-3-methoxyphenylamide, alkyl ethers of 4-hydroxy-3-methoxybenzyl alcohol, in particular 4-hydroxy-3-methoxybenzyl-n-butyl ether, alkyl ethers of 4-acyloxy-3-methoxybenzyl alcohol, in particular 4-acetyl-oxy-3-methoxybenzyl-n-butyl ether and 4-acetyloxy-3-methoxybenzyl-n-hexyl ether, alkyl ethers of 3-hydroxy-4-methoxybenzyl alcohol, alkyl ethers of 3,4-dimethoxybenzyl alcohol, alkyl ethers of 3-ethoxy-4-hydroxybenzyl alcohol, alkyl ethers of 3,4-methylenedioxybenzyl alcohol, (4-hydroxy-3-methoxyphenyl)acetic acid amides, in particular (4-hydroxy-3-methoxyphenyl) acetic acid-N-n-octylamide, vanillomandelic acid alkyl amides, ferulic acid phenethylamide, nicotinaldehyde, methyl nicotinate, propyl nicotinate, 2-butoxyethyl nicotinate, benzyl nicotinate, 1-acetoxychavicol, polygodial and isodrimeninol, further preferably cis- and/or trans-pellitorin according to WO 2004/000787 or WO 2004/043906, alkenecarboxylic acid N-alkylamides according to WO 2005/044778, mandelic acid alkylamides according to WO 03/106404 or alkyloxyalkanoic acid amides according to WO 2006/003210.

Preferred pungent tasting and/or sensation of warmth and/or tingling sensation on the skin or mucous membranes evoking natural extracts, which may be components of the products according to the invention, are e.g.: extracts from peppers, extracts from pepper (e.g. *Capsicum* extract), extracts from chili peppers, extracts from ginger roots, extracts from *Aframomum melgueta*, extracts from *Spilanthes acmella*, extracts from *Kaempferia galanga* or extracts from *Alpinia galanga*.

Preferred substances for masking one or more unpleasant taste impressions, in particular a bitter, astringent and/or metallic taste impression or aftertaste, which can be a component of the products according to the invention, are: lactisol (20-(4-methoxyphenyl)lactic acid) (cf. U.S. Pat. No. 5,045,336), 2,4-dihydroxybenzoic acid potassium salt (cf. U.S. Pat. No. 5,643,941), ginger extracts (cf. GB 2,380,936), neohesperidine dihydrochalcone (cf. Manufacturing Chemist 2000, July issue, pp. 16-17), certain flavones (2-phenylchrom-2-en-4-one) (cf. U.S. Pat. No. 5,580,545), certain nucleotides, such as e.g. cytidine-5'-monophosphates (CMP) (cf. US 2002/0177576), certain sodium salts such as sodium chloride, sodium citrate, sodium acetate and sodium lactate (cf. Nature, 1997, vol. 387, p. 563), a lipoprotein of 13-lactoglobulin and phosphatidic acid (cf. EP 635 218), neodiosmin (5,7-dihydroxy-2-(4-methoxy-3-hydroxyphenyl)-7-O-neohesperidosyl-chrom-2-en-4-one) (cf. U.S. Pat. No. 4,154,862), preferably hydroxyflavanones according to EP 1 258 200, thereby again preferably 2-(4-hydroxyphenyl)-5,7-dihydroxychronnan-4-one (naringenin), 2-(3,4-dihydroxyphenyl)-5,7-dihydroxychroman-4-one (eriodictyol), 2-(3,4-dihydroxyphenyl)-5-hydroxy-7-methoxychroman-4-one (eriodictyol-7-methyl ether), 2-(3,4-dihydroxyphenyl)-

7-hydroxy-5-methoxychroman-4-one (eriodictyol-5-methyl ether), and 2-(4-hydroxy-3-methoxyphenyl)-5,7-dihydroxy-chroman-4-one (homoeriodictyol), their (2S)- or (2R)-enantiomers or mixtures thereof and their mono- or polyhydric phenolate salts with Na+, K+, NH4+, Ca2+, Mg2+ or Al3+ as countercations, or gamma-aminobutyric acid (4-aminobutanoic acid, as neutral form ("inner salt") or in the carboxylate or ammonium form) according to WO 2005/096841.

Substances that taste bitter, astringent, sticky, dusty, dry, mealy, rancid, or metallic include xanthine alkaloids, xanthines (caffeine, theobromine, theophylline), alkaloids (quinine, brucine, nicotine), phenolic glycosides (e.g. salicin, arbutin), flavonoid glycosides (e.g. hesperidin, naringin), chalcones, and chalcone glycosides. (e.g. salicin, arbutin), flavonoid glycosides (e.g. hesperidin, naringin), chalcones and chalcone glycosides, hydrolyzable tannins (gallic or elagic esters of carbohydrates, e.g. pentagalloyl, pentachloroethylene, pentachloroethylene), (gallic or elagic acid esters of carbohydrates, e.g. penta-galloyl-glucose), non-hydrolyzable tannins (possibly galloylated catechins or epicatechins and their oligomers, e.g. proanthyocyanidins or procyanidins, thearubigenin), flavones (e.g. quercetin, taxidin). e.g. quercetin, taxifolin, myricetin), other polyphenols (gamma-oryzanol, caffeic acid or their esters), terpenoid bitter substances (e.g. limonoids such as limonin or nomilin from *citrus* fruits, lupolones and humolones from hops, Iridoids, secoiridoids), absinthin from wormwood, amarogentin from gentian, metallic salts (potassium chloride, sodium sulfate, magnesium sulfate), certain pharmaceutical agents (e.g e.g. fluoro-quinolone antibiotics, paracetamol, aspirin, beta-lactam antibiotics, ambroxol, propyl-thiouracil, guaifenesin), certain vitamins (e.g. vitamin H, vitamins from the B series such as vitamin B1, B2, B6, B12, niacin, panthotenic acid), denatonium benzoate, sucralose octaacetate, potassium chloride, magnesium salts, iron salts, aluminum salts, zinc salts, urea, unsaturated fatty acids, especially unsaturated fatty acids in emulsions, amino acids (e.g. leucine, isoleucine, valine, tryptophan, proline, histidine, tyrosine, lysine and phenylalanine), peptides (in particular peptides with an amino acid from the group consisting of leucine, isoleucine, valine, tryptophan, proline or phenylalanine at the N- or C-terminus).

Substances that have a bitter, astringent, gluey, dusty, dry, mealy, rancid or metallic aftertaste may belong, for example, to the group of sweeteners or sugar substitutes. Exemplary compounds include aspartame, neotame, superaspartame, saccharin, sucralose, tagatose, monellin, steviosides, thaumatin, miraculin, glycyrrhizin and derivatives thereof, cyclamate, and the pharmaceutically acceptable salts of the foregoing compounds.

Advantageous additives for incorporation into the products of the invention are emulsifiers (e.g. lecithins, diacylglycerols, gum arabic), stabilizers (e.g. carageenan, alginate), preservatives (e.g. benzoic acid, sorbic acid), antioxidants (e.g. e.g. tocopherol, ascorbic acid), chelators (e.g. citric acid), plant extracts, natural or synthetic colorants or color pigments (e.g. carotenoids, flavonoids, anthocyanins, chlorophyll and their derivatives).

Products according to the invention, in particular foodstuffs, preparations for pleasure, beverages, semi-finished goods, oral hygiene, cosmetic or pharmaceutical products, may further contain antioxidants or substances capable of enhancing an antioxidant effect, preferably naturally occurring tocopherols and their derivatives (e.g. vitamin E-acetate), vitamin C and their salts or derivatives (e.g. ascorbyl palmitate, Mg-ascorbyl phosphate, ascorbyl acetate), vitamin A and derivatives (vitamin A-palmitate), tocotrienols, flavonoids, alpha-hydroxy acids (e.g. citric acid, lactic acid, malic acid, tartaric acid) and their Na, Ka and Ca salts, flavonoids, quercetin, phenolic benzylamines, propyl gallate, octyl gallate, dodecyl gallate, butylhydroxyanisole (BHA, E320), butylhydroxytoluene (BHT, 2,6-di-tert. butyl-4-methyl-phenol, E321), lecithins, mono- and diglycerides of fatty acids esterified with citric acid, carotenoids, carotenes (e.g. alpha-carotene, beta-carotene, lycopene) and derivatives thereof, phytic acid, lactoferrin, EDTA, EGTA, folic acid and derivatives thereof, ubiquinone and ubiquinol and derivatives thereof, ferulic acid and derivatives thereof, zinc and derivatives thereof, resp. compounds (e.g. ZnO, ZnSO4), selenium and its derivatives or compounds (e.g. selenomethionine), orthophosphates and Na, Ka and Ca salts of monophosphoric acid as well as ingredients, extracts or fractions thereof isolated from plants, e.g. from tea, green tea, algae, grape seeds, wheat germ, chamomile, rosemary, oregano.

Preferred cooling agents are: L-menthol, D-menthol, racemic menthol, menthone glycerol acetal (trade name: Frescolat® MGA), menthyl lactate (trade name: Frescolat® ML, preferably menthyl lactate and L-menthyl lactate, especially L-menthyl L-lactate), substituted menthyl-3-carboxylic acid amides (e.g. Menthyl-3-carboxylic acid N-ethylamide), 2-Isopropyl-N-2,3-trimethylbutanamide, substituted cyclohexane-carboxylic acid amides, 3-menthoxy-propane-1,2-diol, 2-hydroxyethyl-menthyl carbonate, 2-hydroxypropylmenthyl carbonate, N-acetylglycine menthyl ester, Isopulegol, menthyl-hydroxycarboxylic acid ester (e.g. e.g., menthyl-3-hydroxybutyrate), monomenthyl succinate, 2-mercaptocyclodecanone, menthyl-2-pyrrolidine-5-onecarboxylate, 2,3-dihydroxy-p-menthane, 3,3,5-trimethylcyclohexanone glycerol ketal, 3-menthyl-3,6-di- and -trioxaalkanoates, 3-menthyl methoxyacetate, and icilin.

Particularly preferred cooling agents are: 1-menthol, racemic menthol, menthone glycerol acetal (trade name: Frescolat® MGA), menthyl lactate (preferably 1-menthyl lactate, especially 1-menthyl L-lactate, trade name: Frescolat® ML), 3-menthoxy propane-1,2-diol, 2-hydroxyethyl menthyl carbonate, 2-hydroxypropyl menthyl carbonate.

Depending on the substance, the application concentration of the cooling active ingredients to be used is preferably in the concentration range from 0.01 to 20% by mass and preferably in the concentration range from 0.1 to 5% by mass, based on the total mass of the finished (ready-to-use) products according to the invention.

The products according to the invention may contain, for example, the following dyes, colorants or pigments: lactoflavin (riboflavin), beta-carotene, riboflavin 5'-phosphate, alpha-carotene, gamma-carotene, cantaxanthin, erythrosin, curcumin, quinoline yellow, yellow orange S, tartrazine, bixin, norbixin (annatto, orlean), capsanthin, capsorubin, lycopene, beta-apo-8'-carotenal, beta-apo-8'-carotenoic acid ethyl ester, xantophylls (flavoxanthin, lutein, cryptoxanthin, rubixanthin, violaxanthin, rodoxanthin), true carmine (carminic acid, cochineal), azorubin, cochineal red A (Ponceau 4 R), beet red, betanin, anthocyanins, amaranth, patent blue V, Indigotin I (Indigo carmine), chlorophylls, copper compounds of chlorophylls, brilliant acid green BS (lisamine green), brilliant black BN, carbo medicinalis vegetabilis, titanium dioxide, iron oxides and hydroxides, calcium carbonate, aluminum, silver, gold, ruby pigment BK (litholrubin BK), Methyl violet B, Victoria blue R, Victoria blue B, Acilan brilliant blue FFR (Brilliant wool blue FFR), naphtol green B, acilan true green 10 G (alkali true green 10 G), Ceres yellow GRN, Sudan blue II, ultramarine, phthalocyanine blue, phthalocayanine green, true acid violet R. Other naturally derived extracts (e.g. paprika extract, black carrot extract, red charcoal extract) can be used for dyeing purposes. Good results have also been obtained with the following dyes, known as aluminum lakes: FD & C Yellow5 Lake, FD & C Blue 2 Lake, FD & C Blue 1 Lake, Tartrazine Lake, Quinoline Yellow Lake, FD & C Yellow 6 Lake, FD & C Red 40 Lake, Sunset Yellow Lake, Carmoisine Lake, Amaranth Lake, Ponceau 4R Lake, Erythrosyne Lake, Red 2G Lake, Allura Red Lake, Patent Blue V Lake, Indigo Carmine Lake, Brilliant Blue Lake, Brown HT Lake, Black PN Lake, Green S Lake and their blends.

Suitable (mineral) fillers for incorporation in the products according to the invention are, for example, calcium carbonate, titanium dioxide, silicon dioxide, talc, aluminum oxide, dicalcium phosphate, tricalcium phosphate, magnesium hydroxide and mixtures thereof.

The other usual basic, auxiliary and/or additive substances for products according to the invention can generally be present in amounts of 0.00001 to 99.9% by mass, preferably 10 to 80% by mass, based on the total weight of the product preparation. Furthermore, the preparations or products may comprise water or other solvents in an amount up to 99.9% by mass, preferably 5 to 80% by mass, based on the total weight of the product preparation.

According to a further preferred embodiment, flavors and/or fragrances contained in the products are first incorporated into a matrix (carrier) suitable for this purpose, e.g. in the form of emulsions, liposomes, e.g. starting from phosphatidylcholine, microspheres, nanospheres or also in capsules, granules or extrudates, before they are used in the production of the products according to the invention. Particularly preferably, the matrix is selected in such a way that the flavors and/or fragrances are released from the matrix with a delay, so that a long-lasting effect is achieved.

Preferred matrices into which the flavors and/or fragrances are incorporated prior to their use preferably comprise one or more materials selected from the following group: carbohydrate polymers (polysaccharides) (e.g., starch, starch derivatives, cellulose or cellulose derivatives (e.g. e.g. hydroxypropyl cellulose), alginates, gellan gum, agar or carragheen), natural fats, natural waxes (e.g. beeswax, carnauba wax), proteins, e.g. gelatin, complexing agents (e.g. cyclodextrins or cyclodextrin derivatives, preferably beta-cyclodextrin).

It has also been proved advantageous to convert flavors and/or fragrances into a spray-dried form prior to their use in the manufacture of the products according to the invention. Individual substances or mixtures of substances can be used as matrices for the flavors and/or fragrances to be used in spray-dried form. Advantageous carriers are carbohydrates and/or carbohydrate polymers (polysaccharides). Preferred carriers are: hydrocolloids such as starches, degraded starches, chemically or physically modified starches, modified celluloses, gum arabic, ghatti gum, traganth, karaya, carrageenan, guar gum, locust bean gum, alginates (e.g. Na-alginate), pectin, inulin or xanthan gum. Preferred carriers are maltodextrins as well as mixtures of maltodextrins and gum arabic, with maltodextrins with DE values in the range 15 to 20 being advantageous in each case. The degree of decomposition of the starch is measured by the "dextrose equivalent" (DE) index, which can assume the limit values 0 for the long-chain glucose polymer and 100 for the pure glucose. Encapsulation by spray-drying is known to those skilled in the art, and is described, for example, in U.S. Pat. Nos. 3,159,585, 3,971,852, 4,532,145 or 5,124,162. Spray-dried flavors are commercially available in various flavors and particle sizes.

Furthermore, the information already provided on the adsorption and/or desorption processes according to the invention, including the preferred embodiments, applies to the uses of the concentrates according to the invention and to the alternative enrichment processes according to the invention.

In the context of the present invention, a sensory evaluation or sensory test of a sample is preferably carried out in such a way that a sample, usually 20 ml, of a liquid fraction diluted with water is placed in the mouth by a trained tester, whereby the sample is evaluated gustatorily and/or retronasally for sensory impressions in comparison with a reference sample. The reference sample used here is the juice and/or the alcohol-containing beverage as such and/or such and/or alternatively a food or an aqueous food preparation. Unless otherwise mentioned, a sensory test of a particular volatile fraction is performed independently by 3 or 5 test subjects. In this test, the samples are coded and tasted in randomized order and under exclusion of disturbing influences such as color, noise and foreign odors in a sensory room. A sensory match of the sample with the reference requires a corresponding evaluation of all test persons involved in the respective test.

In the context of the present invention, the term "comprising" or "having" denotes an open enumeration and does not exclude other components or steps in addition to those expressly mentioned (the same applies to "comprising", "containing", etc.). When, in the context of the present invention, a preparation is described using the term "comprising" or "comprising", this expressly includes preparations that comprise or consist essentially of said components.

The term "consist of" or "consisting of" in the context of the present invention denotes a closed enumeration and excludes any other components or steps in addition to those expressly mentioned.

The expression "consisting essentially of" or "consisting essentially of" in the context of the present invention denotes a partially closed enumeration and denotes preparations which, in addition to the constituents mentioned, have only such other constituents as do not materially change the character of the preparation or are present in amounts which do not materially change the character of the preparation.

Further features and advantages of the invention will be apparent from the following description of preferred embodiments.

EXAMPLES

1. Distillation of Fruits by a Spinning Cone Column

The distillative production/distillation of an aromatic, aqueous or aqueous-alcoholic solution of fruits in water is carried out as described in DE 36 86 492 T2. The spinning cone column is run in countercurrent at a vacuum of 80 to 100 mbar. During this process, the aqueous solution is heated to 50-60° C. and the temperature is maintained. The stripping ratio is about 5-6 with respect to return flow to clearance. The evaporation rate is increased by increasing the temperature and decreasing the stripping ratio to such an extent that there is no reduction in sensory quality. Nitrogen is used as an inert gas to protect the volatile fraction from undesirable oxidation reactions. The distillate yield is between $\frac{1}{100}$ and $\frac{1}{200}$ of the liquid raw material used.

TABLE 1

Obtaining distillates from fruits by spinning cone column distillation

| Aqueous phase (AP) | Amount [kg] | Concentrate [kg] | Amount of value-adding flavor compounds in the AP [mg/kg] | Sensory at 0.9% by mass dosing of AP |
|---|---|---|---|---|
| Williams pear puree | 100 | 1 | 470 | estrous, pear, sweet, ripe, juicy |
| White peach puree | 200 | 1 | 170 | green, estrous, peachy, fruity, juicy |
| Orange juice | 200 | 1 | 83 | floral, orange, fresh pungent, juicy |
| Apple puree | 100 | 1 | 570 | green, aldehydic, fruity, stale, juicy |

Table 1 shows that by using a spinning cone column, distillates identical in sensory terms to the starting raw material are obtained. The water phase is diluted back to the initial concentration for tasting, i.e. a dosage of 0.9% by mass corresponds to a concentration by a factor of 110. In general, the distillate amounts to 0.5% or 1% by mass of the starting raw material, which means that the flavor compounds have already been enriched.

However, the concentration of the flavoring substances is too low and the dosage of, for example, 0.9% by mass in the foodstuff is too high for these distillates to be incorporated into flavoring mixtures. Another limiting factor is the amount of main fermentation products, which, expressed in terms of ethanol, is between 0.1 and 10% by volume in the distillate according to Table 2 when concentrated by a factor of 100.

TABLE 2

Ethanol contents of purees and juices from various fruits after fresh processing and processing of the fruits after one day of storage

| Fruit juices, each freshly pressed | EtOH content directly after production [mg/kg] | EtOH content after 1 day storage [mg/kg] | Value-adding flavor compounds content after 1 day storage [mg/kg] | Ratio Ethanol/ Sum flavor compounds V(E/A) [ ] | EtOH content calculated at 100-fold concentration of stored product |
|---|---|---|---|---|---|
| Orange juice | 468 | 486 | 8.83 | 55 | 4.86 |
| Tangerine juice type Clemenules | 229 | 246 | 6.16 | 40 | 2.46 |
| Strawberry juice | <10 | 24 | 4.93 | 5 | 0.24 |
| White peach juice | 151 | 907 | 3.92 | 231 | 9.07 |
| Calanda peach juice | 119 | 135 | 4.64 | 29 | 1.35 |

The storage tests with the freshly squeezed fruit juices in Table 3 show that significant amounts of ethanol are present after just one day storage of a fruit, which far exceed the sum of the value-giving flavor compounds in their quantity. Thus, the ratio of ethanol to the sum of value-giving flavor compounds is >1 (Table 2). The amount of the ratio depends essentially on the stability of the fruit and the type of fruit. In practice, fruits are often stored for 24 hours after mechanical harvesting until processing, since the harvest itself, transport and the many processing stages on an industrial scale require this time, which is why the formation of main fermentation products is unavoidable.

To determine the amount of flavor compounds, an alcoholic extract is diluted with solvent, e.g. pentane, and transferred directly to a gas chromatograph (GC) by liquid injection into a cold feed system (CIS 4, Gerstel). The sample is transferred from the cold feed system to the separation column at 40° C. with a heating rate of 12° C./s to 180° C. (5 min isothermal).

If an aqueous solution, such as a puree, is present, 100 mg of the sample is stirred with a polydimethylsiloxane (PDMS) coated magnetic stir bar (10 mm long, 1 mm layer thickness) for 1 h. The magnetic stir bar is then removed. The magnetic stir bar is then removed and subsequently baked at 150° C. degrees using a thermal desorption unit on the GC. The volatile compounds are thereby applied to the chromatographic system (GC 7890B, Agilent) (capillary column with WAX coating 30 m×0.25 mm×0.25 µm), separated in the process (temperature program from 40° C. at 3° C./min to 230° C., helium flow of 2 ml/min) and analyzed by mass spectrometry (MSD 5977B, Agilent). The MS transfer line was heated to 280° C., the ion source to 230° C., and the quadrupole to 150° C. Mass spectrometric detection was performed in positive EI mode at 70 eV in full-scan mode (m/z 25-350). Data acquisition was performed using GC-MS Mass Hunter software (Agilent 807.05.2479) and data analysis was performed using AMDIS (V 3.2.13.03.08).

The peak areas are then set in relation to 2-nonanol, as a known standard/comparison, and are output as content data, taking response factors into account.

To determine the alcohol content, 100 µl of the sample to be analyzed is placed in a 100 ml volumetric flask and diluted to the intended level (100 ml at room temperature or standard conditions) by adding water. The solution is analyzed by high-performance liquid chromatography (HPLC, Agilent 1100). Separation is performed on a LiChrospher 100 RP-8, 5 µm (250 mm×4 mm) column at a flow rate of 0.9 ml/min, isocratically with water as the mobile phase. A refractive index detector is used for detection and ethanol is quantified via external calibration.

Distillation with the spinning cone column raises the concentration of value-giving flavor compounds from single-digit mg/kg values to triple-digit mg/kg values and enriches value-giving flavor compounds. Thus, the SCC distillate of white peach shows a concentration of value-giving flavor compounds of 170 mg/kg and an ethanol content of 0.4% by mass, and thus an improvement, i.e., in terms of the present invention, a decrease in the ratio of ethanol (in mg) to total flavor compounds (V(E/A) ratio) (in mg) from 24 to 22.

2. Adsorption/Desorption Process

The distillate is then further concentrated by an adsorption/desorption process, preferably without the use of organic solvents. In the adsorptive concentration of aqueous solutions, as described in EP 2 075 320 A1, the aqueous solution is passed through a bed of a porous sorbent surface-modified with organic residues. The bulk is subsequently eluted with a small amount of an organic solvent, preferably ethanol, compared to the aqueous solution.

TABLE 3

Analysis of flavor concentrates by sorptive concentration of spinning cone column distillates of white peach (A) and orange juice (B).

| A Name | Distillate [mg/kg] | Concentrate [mg/kg] |
|---|---|---|
| Hexanol | 81.0 | 17828 |
| 2-E-hexenol | 44.6 | 7421 |
| 2-E-hexenal | 20.0 | 5648 |
| 3-Z-hexenol | 7.8 | 970 |
| Hexanal | 5.1 | 1001 |
| 3-E-hexenol | 1.3 | 319 |
| Linalool | 1.2 | 223 |
| 1,3-pentenol | 1.2 | 23 |
| Isoamylalcohol | 0.6 | 33 |
| 2-Z-pentenol | 0.5 | 5 |
| gamma-decalacton | 0.5 | 260 |
| 2-Z-hexenol | 0.4 | 139 |
| 3-Z-hexenylacetate | 0.4 | 91 |
| Isobutanol | 0.3 | 2 |
| Benzylalkohol | 0.3 | 46 |
| 2-E-hexenylacetate | 0.2 | 63 |

| (B) Name | Distillate [mg/kg] | Concentrate [mg/kg] |
|---|---|---|
| Linalool | 29.2 | 8544 |
| Octanol | 8.2 | 2012 |
| Isoamylalcohol | 5.2 | 317 |
| Ethylbutyrate | 4.9 | 1225 |
| 4-Terpinenol | 4.9 | 1198 |
| alpha-Terpineol | 4.0 | 1027 |
| 2-E-Hexenal | 2.6 | 674 |
| Octanal | 2.5 | 725 |
| 3-Hydroxy-ethylhexanoate | 2.5 | 535 |
| 2-Methylbutanol | 2.4 | 90 |
| Hexanol | 2.4 | 396 |
| Ethylacetate | 2.1 | 91 |
| Hexanal | 1.7 | 576 |
| 3-Z-Hexenol | 1.2 | 156 |
| Isobutanol | 0.9 | 17 |
| Citronellol | 0.8 | 218 |
| Neral | 0.7 | 333 |
| Nerol | 0.7 | 178 |
| Geranial | 0.7 | 389 |
| Geraniol | 0.6 | 145 |

Table 3 shows the GC-MS/FID analysis of white peach puree (A) and orange juice (B). At a concentration factor of 200, 3.4% sum of all value-giving flavor compounds is to be expected. 3.6% were actually measured in the concentrate from the white peach.

In the case of orange juice, 1.8% would be expected at complete recovery, and 2.2% was actually determined. This deviation is due to the better detectability of trace components in the concentrate. The analytical values, as well as the sensory properties of the rediluted concentrates, show that the combination of spinning cone column distillation and sorptive concentration is suitable for converting the authentic-smelling distillate into a concentrate without any reduction in the odor quality and without any noticeable change in the profile of the value-giving flavor compounds.

It was found that the contents of alcohols, in particular butanol, isobutanol, 2-methylbutanol, isoamyl alcohol and 1,3-pentenol (Table 3) are depleted in the concentrate without being sensory perceptible. For example, the recovery of isobutanol is 3.5%, isoamyl alcohol is 26% and 1,3-pentenol is 10% (Table 3 A), and the recovery of isobutanol is 9%, 2-methylbutanol is 19% and isoamyl alcohol is 31% in the concentrate on the orange juice (Table 3 B).

When the adsorbent material was thermodesorbed with steam and the oil phase was obtained from the apple, the fruit's own ethanol was largely reduced (Table 4).

TABLE 4

Gas chromatographic analysis of an apple water phase and its concentrates obtained therefrom using various adsorbent materials as well as eluents.

| Name | Output apple water phase distillate [mg/kg] | Ad-/desorption with polystyrene and ethanol as eluent (A) [mg/kg] | Ad-/desorption with polystyrene and water vapor as eluent (B) [mg/kg] | Ad/desorption with activated carbon and water vapor as eluent (C) [mg/kg] |
|---|---|---|---|---|
| 2-E-Hexenal | 24.63 | 1601.32 | 29807.59 | 4.90 |
| Hexanal | 8.45 | 202.10 | 13430.34 | 2.09 |
| Hexanol | 36.16 | 7104.88 | 234557.04 | 22.71 |
| 2-E-Hexenol | 4.94 | 1736.44 | 40814.51 | 3.58 |
| 2-Methylbutanol | 3.07 | 2465.38 | 36193.31 | 3.19 |
| Butylalcohol | 1.52 | 2595.18 | 10555.63 | 2.32 |
| Isoamylalcohol | 0.52 | 752.96 | 11309.28 | 0.30 |
| Butylacetate | 10.68 | 399.12 | 9585.36 | 2.88 |
| 2-Methylbutylacetate | 7.35 | 217.81 | 6408.29 | 1.05 |
| Hexylacetate | 4.13 | 120.80 | 5081.51 | 0.53 |
| 2-E-Hexenylacetate | 2.88 | 74.37 | 2933.37 | 0.48 |
| Ethylbutyrate | 2.01 | 85.00 | 1751.00 | 0.63 |

To carry out the solvent-free desorption, a common activated carbon (70 g CarboTech CGF4/90), as well as a special crosslinked macroporous polystyrene (147 g Lewatit® VP OC 1064) were first loaded with the water phase at 5.5 and 7 kg each. After loading, the column filling was dried with inert gas (nitrogen) and then eluted with water vapor (Table 5 B and C). The elution of the polystyrene material with ethanol served as a comparison (Table 5 A). The columns here each have an inner diameter of 3.7 cm and a height of 25 cm. The desorption of the columns filled with activated carbon or the crosslinked macroporous polystyrene as adsorbent material was carried out in each case with steam at 5 mL/min and 2 bar and was stopped after condensation of five times the column volume.

The eluate of the activated carbon shows a loading of 40 mg/kg and thus no concentration compared to the initial water phase. Surprisingly, it was found that in comparison, the flavor compounds could be quantitatively eluted from the polystyrene material with water vapor, resulting in the turbidity of the eluate followed by the formation of an oil phase. The recovery of water vapor desorption is comparable to ethanolic desorption, except for ethanol and the fusel alcohols (Table 5). The content of ethanol in the oil was <1%. The adsorption and desorption processes thus resulted in further concentration of the flavor compounds and depletion of ethanol and fuselic alcohols, so that the ratio of ethanol to total flavor compounds is clearly <1.

Tasting of the water phase at 0.1%, compared to the ethanolic concentrate at 30 mg/kg dosage, (Table 4 A) and the solvent-free aroma oil at 10 mg/kg dosage (Table 4 B) on water, showed strongly pronounced green, fruity-estrusy, apple-like notes that are authentic and comparable to the initial water phase. Thus, it was demonstrated that the combination of special distillation and adsorption/desorption described here yields a highly concentrated flavor concentrate with V(E/A) <1, which at low dosage to the food (e.g., <0.1%) imparts to it an intense flavor corresponding to the starting material.

The gradual concentration of value-adding flavor compounds and depletion of main fermentation products by combining spinning cone column distillation and adsorption/desorption makes it possible to obtain a particularly intensive and authentic concentrate during the dealcoholization of beer (Table 5).

TABLE 5

Gas chromatographic analysis of a distillate and concentrate obtained from Pilsner beer

| Name | Pilsner beer SCC distillate [mg/kg] | Beer flavor concentrate [mg/kg] |
|---|---|---|
| 2-Methylbutanol | 246.10 | 1493.7 |
| Isoamylalkohol | 230.94 | 5464.9 |
| Isobutanol | 103.92 | 263.3 |
| 2-Phenylethylalkohol | 19.18 | 1116.7 |
| Isoamylacetate | 5.83 | 335.6 |
| Octanoic acid | 5.63 | 283.7 |
| 2-Phenylethylacetat | 2.55 | 189.0 |
| Ethylcapronate | 2.18 | 48.9 |
| Butanol | 1.57 | 3.4 |
| Ethylcaprylate | 0.33 | 20.3 |
| Isobutylacetate | 0.03 | 20.0 |

The spinning cone column distillate with an ethanol content of 45% by volume from a beer Pilsner type with 5% by volume was concentrated 250-fold. Adsorption was performed with a 300 L capacity stainless steel column filled with polystyrene material and desorbed with 100 kg of beer alcohol. Rearomatization of the dealcoholized base was performed with 0.3 g/L of the concentrate, giving it back its typical floral, terpenic, malty notes without exceeding the residual alcohol content of 0.05% by volume. The V(E/A) ratio improved from 2500 for the beer used at 5% by volume to 690 for the distillate at 45% by volume and to 94 for the beer concentrate after elution with beer alcohol and <1 for desorption with water vapor, respectively.

TABLE 6

Gas chromatographic analysis of a distillate and concentrate obtained therefrom from wine

| Name | Wine SCC distillate [mg/kg] | Wine flavor concentrate [mg/kg] |
|---|---|---|
| Isoamylalcohol | 1278.89 | 1742.3 |
| Isobutanol | 162.25 | 30.5 |
| Ethylcapronate | 118.46 | 3620.6 |
| Isoamylacetate | 109.26 | 7335.6 |
| Ethylcaprylate | 85.30 | 3415.1 |
| Ethylbutyrate | 57.42 | 427.5 |
| Ethylcaprinate | 35.94 | 1449.7 |
| Hexanol | 23.05 | 230.8 |
| Hexylacetate | 19.86 | 891.3 |
| Butanol | 5.17 | 2.3 |
| 2-Phenylethylalcohol | 2.79 | 20.9 |
| 3-Z-Hexenol | 1.47 | 3.1 |
| Linalool | 1.39 | 24.2 |

The distillate according to Table 6 contains 60% alcohol by volume and is diluted with water in a ratio of 1/10 for adsorption. By adsorption of 8000 kg of diluted red wine with a 20 L column filled with the polystyrene adsorbent material and desorption with 16 kg of a strongly alcoholic wine fraction, a wine flavor concentrate is obtained, which at a dosage of 0.035% to the dealcoholized wine gives it back its typical red-fruity, flowery and spicy character. With an alcohol content of 0.015% by volume of the dealcoholized wine, the total alcohol content after rearomatization is 0.05% by volume, at which a "0.0% by volume" claim can be made.

The invention claimed is:

1. A method for obtaining a volatile fraction of concentrated aroma, flavor, and/or fragrance compounds from an ethanol-containing juice or beverage comprising ethanol and the aroma, flavor, and/or fragrance compounds, the method comprising:
   (a) obtaining a distillate from the ethanol-containing juice or beverage by subjecting the ethanol-containing juice or beverage to spinning cone column distillation, wherein the distillate comprises the aroma, flavor, and/or fragrance compounds;
   (b) contacting the distillate of (a) with a sorbent to obtain a loaded sorbent; and
   (c) recovering a volatile fraction containing the aroma, flavor, and/or fragrance compounds from the loaded sorbent of (b) by thermal desorption at a temperature of 90 to 200° C. using a desorbent of ethanol-free water vapor containing less than 5% by mass of organic compounds other than ethanol,
   wherein the aroma, flavor, and/or fragrance compounds in the volatile fraction of (c) are concentrated compared to the ethanol-containing juice or beverage such that a ratio of ethanol in the volatile fraction to a sum of aroma, flavor, and/or fragrance compounds in the volatile fraction (V(E/A)) is 0.1 to 20, and addition of 0.001 to 0.1% by mass of the volatile fraction to a food preparation produces a perceptible odor impression and/or taste impression.

2. The method according to claim 1, wherein the spinning cone column distillation is carried out in the form of a countercurrent distillation at a pressure of 1 to 500 mbar.

3. The method according to claim 2, wherein the countercurrent distillation is carried out with an inert gas.

4. The method according to claim 1, wherein the spinning cone column distillation is carried out using a strip ratio in the range of 1:1 to 10:1.

5. The method according to claim 1, wherein the ethanol-containing juice or beverage is maintained at a temperature of 28 to 70° C. for spinning cone column distillation.

6. The method according to claim 1, wherein the sorbent is a porous solid, which is surface-modified with organic residues.

7. The method according to claim 1, wherein the ethanol-containing juice or beverage is:
   a juice selected from fruit juice, berry juice, vegetable juice, or mixture thereof; or
   an alcoholic beverage selected from wine, wine-containing beverages, beer, beer-containing beverages, or mixtures thereof.

8. The method according to claim 3, wherein the inert gas is nitrogen.

9. The method according to claim 1, wherein the sorbent is a polystyrene.

10. The method according to claim 9, wherein the ethanol-containing juice or beverage is a fruit juice, a berry juice, a vegetable juice, or mixture thereof, selected from lemon juice, orange juice, tangerine juice, clementine juice, grapefruit juice, lime juice, kumquat juice, tangor juice, tangelo juice, melon juice, kiwi juice, *papaya* juice, avocado juice, acerola juice, bearberry juice, blackberry juice, blueberry juice, boysenberry juice, cherry juice, virgin grape cherry juice, cloudberry juice, red currant juice, black currant juice, date juice, scratch berry (*Rubus caesius*) juice, elderberry juice, grape juice, gooseberry juice, huckleberry juice, loganberry juice, olallieberry juice, mulberry juice, raisin juice, plains berry juice, prairie berry juice, cranberry juice, raspberry juice, pear juice, splendid raspberry (*Rubus spec-*

*tabilis*) juice, sea buckthorn fruit juice, sloe fruit juice, strawberry juice, white cinnamon raspberry (*Rubus parviflorus*) juice, buckthorn fruit juice, grape berry juice, blueberry juice, apple juice, rhubarb juice, passion fruit juice, plum juice, apricot juice, nectarine juice, quince juice, kiwi juice, star fruit juice, lychee juice, pineapple juice, guava juice, *papaya* juice, passion fruit juice, mango juice, peach juice, carrot juice, tomato juice, cucumber juice, radish juice, beet juice, sauerkraut juice, celery juice, and spinach juice, or a mixture thereof.

11. The method of claim 1, wherein the ratio of the ethanol contained in the volatile fraction to the sum of the aroma, flavor, and/or fragrance compounds in the volatile fraction (V(E/A)) is 0.5 to 20.

12. The method of claim 1, wherein the ratio of the ethanol contained in the volatile fraction to the sum of the aroma, flavor, and/or fragrance compounds in the volatile fraction (V(E/A)) is 1 to 15.

13. A method for obtaining a volatile fraction of concentrated aroma, flavor, and/or fragrance compounds from an ethanol-containing juice or beverage comprising ethanol and the aroma, flavor, and/or fragrance compounds, the method comprising:
   (a) obtaining a distillate from the ethanol-containing juice or beverage by subjecting the ethanol-containing juice or beverage to spinning cone column distillation, wherein the distillate comprises the aroma, flavor, and/or fragrance compounds;
   (b) contacting the distillate of (a) with a sorbent to obtain a loaded sorbent; and
   (c) recovering a volatile fraction containing the aroma, flavor, and/or fragrance compounds from the loaded sorbent of (b) by thermal desorption at a temperature of 90 to 200° C. using an ethanol-free desorbent of water vapor containing less than 5% by mass of organic compounds other than ethanol,
      wherein the aroma, flavor, and/or fragrance compounds in the volatile fraction of (c) are concentrated compared to the ethanol-containing juice or beverage such that a ratio of ethanol in the volatile fraction to a sum of the aroma, flavor, and/or fragrance compounds in the volatile fraction (V(E/A)) is 0.5 to 20, and
      addition of 0.005 to 0.05% by mass of the volatile fraction to a food preparation produces a perceptible odor impression and/or taste impression.

14. The method according to claim 13, wherein the spinning cone column distillation is carried out in the form of a countercurrent distillation at a pressure of 1 to 500 mbar.

15. The method according to claim 13, wherein the countercurrent distillation is carried out with an inert gas.

16. The method according to claim 15, wherein the inert gas is nitrogen.

17. The method according to claim 13, wherein the spinning cone column distillation is carried out using a strip ratio in the range of 1:1 to 10:1.

18. The method according to claim 13, wherein the ethanol-containing juice or beverage is maintained at a temperature of 28 to 70° C. for spinning cone column distillation.

19. The method according to claim 13, wherein the sorbent is a porous solid, which is surface-modified with organic residues.

20. The method according to claim 13, wherein the ethanol-containing juice or beverage is:
   a juice selected from fruit juice, berry juice, and vegetable juice, or mixture thereof; or
   an alcoholic beverage selected from wine, wine-containing beverages, beer, beer-containing beverages, or mixtures thereof.

21. The method according to claim 20, wherein the ethanol-containing juice or beverage is a fruit juice, a berry juice, a vegetable juice, or mixture thereof, selected from lemon juice, orange juice, tangerine juice, clementine juice, grapefruit juice, lime juice, kumquat juice, tangor juice, tangelo juice, melon juice, kiwi juice, *papaya* juice, avocado juice, acerola juice, bearberry juice, blackberry juice, blueberry juice, boysenberry juice, cherry juice, virgin grape cherry juice, cloudberry juice, red currant juice, black currant juice, date juice, scratchberry (*Rubus caesius*) juice, elderberry juice, grape juice, gooseberry juice, huckleberry juice, loganberry juice, olallieberry juice, mulberry juice, raisin juice, plains berry juice, prairie berry juice, cranberry juice, raspberry juice, pear juice, splendid raspberry (*Rubus spectabilis*) juice, sea buckthorn fruit juice, sloe fruit juice, strawberry juice, white cinnamon raspberry (*Rubus parviflorus*) juice, buckthorn fruit juice, grape berry juice, blueberry juice, apple juice, rhubarb juice, passion fruit juice, plum juice, apricot juice, nectarine juice, quince juice, kiwi juice, star fruit juice, lychee juice, pineapple juice, guava juice, *papaya* juice, passion fruit juice, mango juice, peach juice, carrot juice, tomato juice, cucumber juice, radish juice, beet juice, sauerkraut juice, celery juice, spinach juice, or a mixture thereof.

\* \* \* \* \*